Nov. 30, 1965  E. P. SUPERNOR  3,220,030
TAP HOLDER WITH MEANS TO COMPENSATE FOR
MISALIGNMENT OF TOOL AND WORK
Filed Aug. 29, 1963
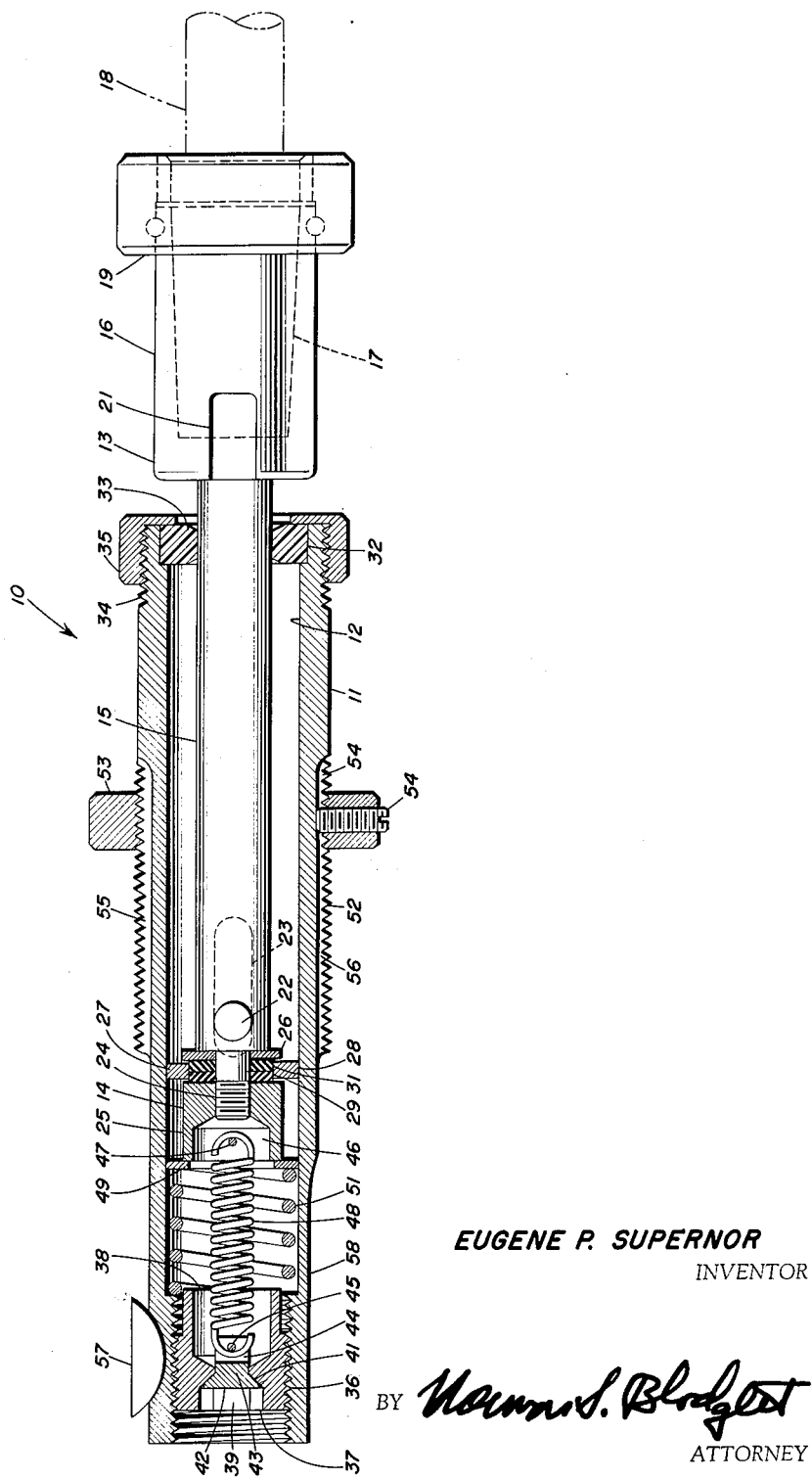
EUGENE P. SUPERNOR
INVENTOR
BY *Norman S. Blodgett*
ATTORNEY

United States Patent Office 3,220,030
Patented Nov. 30, 1965

3,220,030
TAP HOLDER WITH MEANS TO COMPENSATE
FOR MISALIGNMENT OF TOOL AND WORK
Eugene P. Supernor, Worcester, Mass., assignor to The
Heald Machine Company, Worcester, Mass., a corporation of Delaware
Filed Aug. 29, 1963, Ser. No. 305,386
4 Claims. (Cl. 10—129)

This invention relates to a tap holder and, more particularly, to apparatus arranged to be used in a machine tool for holding a tap during a threading operation.

When tapping operations are performed in a machine tool, it is necessary to interpose in the drive between the conventional tool chucking means and the tap an apparatus for permitting relative longitudinal movement of the tap. This provision is necessary in order to permit the tap to move longitudinally independently of the conventional feed of the machine tool. This interposed device, known as a tap holder, should be capable of permitting engagement of the tap with the hole in the workpiece with a considerable force to start the tapping operation. After the tap has engaged the metal and begins to form a thread, the threading action of the tap into the workpiece is likely to cause the tap to advance more rapidly than the machine feed itself. Also, in reversing the action, the motion of the tap as it reverses itself in the threaded bore is likely to cause the tap to move longitudinally out of the bore faster than the machine tool feed mechanism. The tap holder is constructed to permit this relative movement. In many cases, however, the bore is not centered exactly with the machine tool drive, particularly in automatic machining. It is possible that the axis of the bore in the workpiece not only is displaced from the axis of the tool chuck of the machine tool, but it may lay at a slight angle. Conventional tap holders are not capable of compensating for this parallel and angular mis-alignment so that quite often the tap is broken; in any case, an inaccurate thread is formed. These and other difficulties experienced with the prior art devices have been obviated in a novel manner by the present invention.

It is, therefore, an outstanding object of the invention to provide a tap holder which is capable of compensating for angular mis-alignment with the machine tool axis of the bore to be threaded.

Another object of this invention is the provision of a tap holder capable of compensating for both parallel and angular mis-alignment between the axis of the bore to be machined and the machine tool drive axis.

A further object of the present invention is the provision of a tap holder for permitting movement of the tap longitudinally at a faster or slower rate than the machine tool feed while permitting mis-alignment of the workpiece bore without damage to the tap.

It is another object of the instant invention to provide a tap holder permitting the tap to advance into the thread of a workpiece at a faster or slower rate than the machine tool feed, the mount including a resilient means for resisting such relative speed, the forces in the said resilient means being adjustable.

Another object of the invention is the provision of a resilient means to compensate, in horizontal applications, for tool weight.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

A single figure is a longitudinal cross-sectional view of a tap holder embodying the principles of the present invention.

Referring to the drawings, the tap holder, indicated generally by the reference numeral 10, is shown as having an elongated main body 11 of a generally cylindrical form having a longitudinal bore 12 extending therethrough. Slidably carried in the bore is an inner body 13 consisting of a base 14, an elongated shaft 15, and collet 16. The base 14 and the collet 16 are at opposite ends of the shaft 15. The collet 16 is of the conventional type having a tapered bore 17 adapted to receive a tap 18. The collet is provided with a locking collar 19 and with the conventional transverse slot 21 to permit removal of the tap with a wedge (not shown). The shaft 15 lies partly within the bore 12 of the main body 11 and partly outside of it. At the inner end it is provided with a transverse pin 22 which extends laterally outwardly into longitudinal slots 23 extending through the wall of the main body 11. At this same end the shaft 15 is provided with a reduced portion 24, the outer end of which is threaded. The base 14 consists of a nut member 25 having a threaded bore into which the reduced portion 24 is threaded. The nut member 25 is generally cylindrical and has a diameter somewhat larger than the diameter of the shaft 25. Between the nut member 25 and the main portion of the shaft 15 and surrounding the reduced portion 24 is, first of all, a washer 26 and, secondly, a metal ring 27 of hardened metal. The ring 27 is of an annular configuration and has an outer cylindrical surface 28 which slides smoothly in the bore 12 of the main body. Also surrounding the reduced portion 24 of the shaft and lying inwardly of the ring 27 is a pair of rubber washers 29 and 31. The relationship of the nut member 25, the washer 26, the reduced portion 24, and the main portion of the shaft 15 is such as to permit the ring 27 to slide freely between the nut member and the washer. Furthermore, the rubber washers 29 and 31 fit snugly on the reduced portion 24 allowing the shaft 15 to move laterally within the bore 12 by compressing the rubber and without being restricted by the ring 27; the shaft may also move angularly because the ring 27 fits loosely enough between the washer 26 and the nut member 25 to permit a degree of cocking of the shaft 15 without binding on the ring 27.

At the end of the main body 11, where the shaft 15 emerges, the main body is provided with a shallow counterbore 32 in which resides a ring 33 formed of an elastomer material such as neoprene rubber. The main body 11 is provided with a threaded portion 34 at that end on which is threaded a locking cap 35 which is capable of holding the ring 33 in place in the counterbore 32, as well as providing resilient adjustment. The bore 12 in the main body is formed at the end opposite the ring 33 with a reduced threaded portion 36 into which is threaded an adjusting member 37. The adjusting member is provided with a counterbore 38 at the inner side and a socket 39 at the outer side, this socket being formed to receive a hex cross-section Allen wrench. The bottom of the socket 39 is formed with a conical counterbore 41 in which is fitted the enlarged conical head 42 of a spring retainer 43. The spring retainer is provided with a slot 44 facing toward the interior of the main body 11 and across this slot extends a pin 45.

The nut member 25 of the base 14 is provided with a counterbore 46 facing toward the counterbore 38 in the adjusting member 37 and a pin 47 extends across this counterbore. A spring 48 extends from the pin 47 to the pin 45 and is normally under tension. The nut member 25 is provided with a washer 49 and between this washer and the shoulder between the main portion of the bore 12 and the reduced threaded bore 36 is a coil spring 51 which is normally under compression.

The outer surface of the main body 11 is provided with a threaded portion 52 which extends to the end into which the reduced threaded bore 36 extends, and on these threads is located a threaded collar 53 having a set screw 54. Diametrically opposite grooves 55 and 56 are provided and a key 57 is suitably mounted on it. A tapered flat portion 58 is provided on one side to assist in locking the tap holder in the machine tool chuck.

The operation of the invention will now be readily understood in view of the above discussion. The tap holder is mounted in the machine tool by inserting the end with the key 57 in the chuck of the machine tool, the key seating in a suitable keyway in the machine tool. The collar 53 is rotated to lock the tap holder in place and the set screw 54 locks the collar 53 against further rotation. The tap holder 17 is inserted in place and locked with the collar 19. The main body 11 and the inner body 13 is rotated because of the transmission afforded by the pin 22 engaging the surfaces of the slots 23. As the machine tool feeds the tap holder and tap toward the bore in the workpiece, the tap 18 eventually strikes the workpiece so that a reaction takes place against the coil spring 51. This spring is a large, strong spring and determines the force which will permit the tap to start threading the hole. Once the tap takes hold of the work, however, and begins to form the thread, it will move ahead faster than the machine tool is feeding the tap holder. At that time, then, the tap will pull the inner member lengthwise (to the right in the drawing), the base 14 and its ring 27 acting like a piston. This movement is resisted by the tension spring 48 which, however, is a light spring and does not present too much resistance. As the thread is formed, if the hole is angularly misaligned with the axis of the machine tool and the tap holder, the inner body 13 is capable of operating at a slight angle to the axis of the outer body 11. The ring 33 acts as a fulcrum permitting this and the loose fit of the ring 27 between the washer 31 and the nut member 25 permits the inner end of the shaft 15 to move transversely of the bore 12. There is a limit to how far this action can take place, this limit being the point when the rubber washers 29 and 31 reach their maximum resilience. When the rotation of the machine tool is reversed to rotate the tap outwardly, the tap may move faster than the machine tool outfeed, in which case the base 14 and the ring 27 slide in the opposite direction and eventually press against the coil spring 51. If there is any parallel displacement of the axis of the bore to be threaded relative to the axis of the main body 11, the tap holder is capable of accepting this also, because the entire shaft 15 can move laterally, putting a portion of the ring 33 under compression and presenting no particular problem at the base 14 because of its ability to move laterally there without any difficulty.

The amount of tension in the spring 48 and, therefore, the amount of compression in the spring 51 can be adjusted by inserting an Allen wrench in the socket 39 and rotating the adjusting member 37 in or out of the reduced threaded portion 36.

It can be seen that the tap holder, constructed according to the present invention, presents some decided advantages over those used in the past. It readily compensates for lack of angular alignment between the machine tool axis and the bore to be threaded; it compensates for lateral displacement of the hole relative to that axis; it readily compensates for differences in longitudinal travel speed in the tap relative to the feeding rate of the tool chuck of the machine tool, and yet it is simple and rugged in construction; it is capable of being readily manufactured from inexpensive materials and will give a long useful life relatively free of maintenance problems.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A tap holder, comprising
 (a) an elongated main body having a longitudinal bore and adapted to be connected for rotation to a machine tool,
 (b) an inner body slidably and non-rotatively mounted in the bore and adapted to be connected to a tap for forming a thread in a bore of a workpiece, the inner body consisting of a base which fits closely in the bore, of an elongated shaft of substantially less diameter than the bore, and an elastomer washer carried in the base for permitting substantial misalignment between the shaft and the main body, and
 (c) a ring of elastomer material located and locked in place in the bore at one end of the main body and operative on the intermediate portion of the shaft to cause the axis of the shaft normally to be aligned with the axis of the bore, the ring permitting the shaft to slide in a longitudinal direction through it.

2. A tap holder as recited in claim 1, wherein the base is acted on by a spring which is normally under compression and by a spring which is normally under tension.

3. A tap holder as recited in claim 1, wherein the said base consists of a rigid core of substantially less diameter than the bore and a ring whose inner surface is connected to the core and whose outer surface contacts the surface of the bore, the said outer surface being cylindrical so that the ring acts to permit misalignment of the shaft and base relative to the bore.

4. A tap holder as recited in claim 3 wherein the core defines two parallel spaced surfaces extending laterally of the shaft between which the ring is confined, the ring being loosely held between the two surfaces so that the core may move laterally and angularly relative to the ring, a set of elastomer washers lying within the ring to limit lateral angular movement of the core relative to the ring.

References Cited by the Examiner

UNITED STATES PATENTS

| | | | |
|---|---|---|---|
| 376,476 | 1/1888 | Grout et al. | 279—16 |
| 2,484,027 | 10/1949 | Haffey | 279—16 |
| 2,772,094 | 11/1956 | Jamilkowski et al. | 10—129 |
| 3,113,329 | 12/1963 | Andres et al. | 10—129 |

ANDREW R. JUHASZ, *Primary Examiner.*